(12) United States Patent
Acharya

(10) Patent No.: US 6,662,200 B2
(45) Date of Patent: Dec. 9, 2003

(54) MULTIPLIERLESS PYRAMID FILTER

(75) Inventor: Tinku Acharya, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 452 days.

(21) Appl. No.: 09/754,684

(22) Filed: Jan. 3, 2001

(65) Prior Publication Data

US 2002/0087607 A1 Jul. 4, 2002

(51) Int. Cl.[7] ............................................. G06F 17/10
(52) U.S. Cl. .................................. 708/319; 708/303
(58) Field of Search .................. 708/300, 303, 708/316, 319

(56) References Cited

U.S. PATENT DOCUMENTS

| | | |
|---|---|---|
| 4,674,125 A | 6/1987 | Carlson et al. |
| 4,703,514 A | 10/1987 | Van Der Wal |
| 4,829,378 A | 5/1989 | LeGall |
| 5,359,674 A | 10/1994 | van der Wal |
| 5,561,617 A | 10/1996 | Van Der Wal |
| 5,886,912 A * | 3/1999 | Miyake et al. .............. 708/316 |

OTHER PUBLICATIONS

Peter J. Burt, et al., "The Laplacian Pyramid as a Compact Image Code", IEEE Transactions on Communications, vol. Com–31, No. 4, Apr. 1983, XP000570701, 5 Pgs.

Sahinoglou, et al., "A High–Speed Pyramid Image Coding Algorithm for a VLSI Implementation", IEEE Transactions of Circuits and Systems for Video Technology, vol. 1, No. 4, NY, Dec. 1991, XP000249319, pp. 369–374.

Dongning Li, "Minimum Number of Adders for Implementing a Multiplier and its Application to the Design of Multiplierless Digital Filters", IEEE Transactions on Circuits ans Systems II: Analog and Digital Signal Processing, No. 7, NY, Jul. 1995, pp. 453–460.

Dempster, et al., "Comments on Minumum Number of Adders for Implementing a Multiplier and its Application to the Design of Multiplierless Digital Filters", Analog and Digital Signal Processing, vol. 45, No. 2, IEEE Feb. 1998, XP 000771370, pp. 242–243.

Jaehne B, "Digitale Bildverarbeitung", 1991, Springer–Verlag, Berlin Heidelberg, NY, XP 002208396, pp. 107–111.

K.R. Castleman, et al., "Simplified Design of Steerable Pyramid Filters", Perceptive Scientific Instruments, Inc., League City, TX, 1998 IEEE, XP 10289971, pp. 329–332.

* cited by examiner

*Primary Examiner*—Tan V. Mai
(74) *Attorney, Agent, or Firm*—Sharon Wong

(57) ABSTRACT

Embodiments of a multiplierless pyramid filter are described.

8 Claims, 6 Drawing Sheets

| X=<br>$S_1$ | $S_3$<br>($B_3$) | $S_5$<br>($B_5$) | $S_7$<br>($B_7$) |
|---|---|---|---|
| $x_0$ | $x_0$ | $x_0$ | $x_0$ |
| $x_1$ | $s_0^3 = x_0 + x_1$<br>($b_0^3 = x_0 + s_0^3 = 2x_0 + x_1$) | $x_0 + x_1$<br>(?) | $x_0 + x_1$<br>(?) |
| $x_2$ | $s_1^3 = x_0 + x_1 + x_2$<br>($b_1^3 = x_1 + s_1^3 = x_0 + 2x_1 + x_1$) | $s_0^5 = x_0 + x_1 + x_2$<br>($b_0^5 = b_0^3 = s_0^5 = 3x_0 + 2x_1 + x_2$) | $x_0 + x_1 + x_2$<br>(?) |
| $x_3$ | $s_2^3 = x_1 + x_2 + x_3$<br>($b_2^3 = x_2 + s_2^3 = x_1 + 2x_2 + x_2$) | $s_1^5 = x_0 + x_1 + x_2 + x_3$<br>($b_1^5 = b_1^3 = s_1^5 = 2x_0 + 3x_1 + 2x_2 + x_3$) | $s_0^7 = x_0 + x_1 + x_2 + x_3$<br>($b_0^7 = b_0^5 + s_0^7$) |
| $x_4$ | $s_3^3 = x_2 + x_3 + x_4$<br>($b_3^3 = x_3 + s_3^3 = x_2 + 2x_3 + x_4$) | $x_0 + x_1 + x_2 + x_3 + x_4$<br>($b_2^5 = b_2^3 = s_2^5 = x_0 + 2x_0 + 3x_2 + 2x_3 + x_4$) | $s_1^7 = x_0 + x_1 + x_2 + x_3 + x_4$<br>($b_1^7 = b_1^5 + s_1^7$) |
| $x_5$ | $s_4^3 = x_3 + x_4 + x_5$<br>($b_4^3 = x_4 + s_4^3 = x_3 + 2x_4 + x_5$) | $x_1 + x_2 + x_3 + x_4 + x_5$<br>($b_3^5 = b_3^3 = s_3^5 = x_1 + 2x_2 + 3x_3 + 2x_4 + x_5$) | $s_2^7 = x_0 + x_1 + x_2 + x_3 + x_4 + x_5$<br>($b_2^7 = b_2^5 + s_2^7$) |
| $x_6$ | $s_5^3 = x_4 + x_5 + x_6$<br>($b_5^3 = x_5 + s_5^3 = x_4 + 2x_5 + x_6$) | $x_2 + x_3 + x_4 + x_5 + x_6$<br>($b_4^5 = b_4^3 = s_4^5 = x_2 + 2x_3 + 3x_4 + 2x_5 + x_6$) | $x_0 + x_1 + x_2 + x_3 + x_4 + x_5 + x_6$<br>($b_3^7 = b_3^5 + s_3^7$) |
| $x_7$ | $s_6^3 = x_5 + x_6 + x_7$<br>($b_6^3 = x_6 + s_6^3 = x_5 + 2x_6 + x_7$) | $x_3 + x_4 + x_5 + x_6 + x_7$<br>($b_5^5 = b_5^3 = s_5^5 = x_3 + 2x_4 + 3x_5 + 2x_6 + x_7$) | $x_1 + x_2 + x_3 + x_4 + x_5 + x_6 + x_7$<br>($b_4^7 = b_4^5 + s_4^7$) |
| $x_8$ | $s_7^3 = x_6 + x_7 + x_8$<br>($b_7^3 = x_7 + s_7^3 = x_6 + 2x_7 + x_8$) | $x_4 + x_5 + x_6 + x_7 + x_8$<br>($b_6^5 = b_6^3 = s_6^5 = x_4 + 2x_5 + 3x_6 + 2x_7 + x_8$) | $x_2 + x_3 + x_4 + x_5 + x_6 + x_7 + x_8$<br>($b_5^7 = b_5^5 + s_5^7$) |
| $x_9$ | $s_8^3 = x_7 + x_8 + x_9$<br>($b_8^3 = x_8 + s_8^3 = x_7 + 2x_8 + x_9$) | $x_5 + x_6 + x_7 + x_8 + x_9$<br>($b_7^5 = b_7^3 = s_7^5 = x_5 + 2x_6 + 3x_7 + 2x_8 + x_9$) | $x_3 + x_4 + x_5 + x_6 + x_7 + x_8 + x_9$<br>($b_6^7 = b_6^5 + s_6^7$) |
| $x_{10}$ | $s_9^3 = x_8 + x_9 + x_{10}$<br>($b_9^3 = x_9 + s_9^3 = x_8 + 2x_9 + x_{10}$) | $x_6 + x_7 + x_8 + x_9 + x_{10}$<br>($b_8^5 = b_8^3 = s_8^5 = x_6 + 2x_7 + 3x_8 + 2x_9 + x_{10}$) | $x_4 + x_5 + x_6 + x_7 + x_8 + x_9 + x_{10}$<br>($b_7^7 = b_7^5 + s_7^7$) |

FIG. 5

| x | $S_2$ | $S_3$ | $S_4$ | $S_5$ | $S_6$ | $S_7$ |
|---|---|---|---|---|---|---|
| $x_0$ | $x_0$ | $x_0$ | $x_0$ | $x_0$ | $x_0$ | $x_0$ |
| $x_1$ | | | | | | |
| $x_2$ | $x_1+x_2$ | $x_0+x_1+x_2$ | $x_0+x_1+x_2$ | $x_0+x_1+x_2$ | $x_0+x_1+x_2$ | $x_0+x_1+x_2$ |
| $x_3$ | $x_2+x_3$ | $x_1+x_2+x_3$ | $x_0+\ldots+x_3$ | $x_0+x_1+x_2+x_3$ | $x_0+\ldots+x_3$ | $x_0+x_1+x_2+x_3$ |
| $x_4$ | $x_3+x_4$ | $x_2+x_3+x_4$ | $x_0+\ldots+x_4$ | $x_0+x_1+x_2+x_3+x_4$ | $x_0+\ldots+x_4$ | $x_0+x_1+x_2+x_3+x_4$ |
| $x_5$ | $x_4+x_5$ | $x_3+x_4+x_5$ | $x_0+\ldots+x_5$ | $x_0+x_1+x_2+x_3+x_4+x_5$ | $x_0+\ldots+x_5$ | $x_0+x_1+x_2+x_3+x_4+x_5$ |
| $x_6$ | $x_5+x_6$ | $x_4+x_5+x_6$ | $x_0+\ldots+x_6$ | $x_1+x_2+x_3+x_4+x_5+x_6$ | $x_1+\ldots+x_6$ | $x_0+x_1+x_2+x_3+x_4+x_5+x_6$ |
| $x_7$ | $x_6+x_7$ | $x_5+x_6+x_7$ | $x_0+\ldots+x_7$ | $x_2+x_3+x_4+x_5+x_6+x_7$ | $x_2+\ldots+x_7$ | $x_1+x_2+x_3+x_4+x_5+x_6+x_7$ |
| $x_8$ | $x_7+x_8$ | $x_6+x_7+x_8$ | $x_0+\ldots+x_8$ | $x_3+x_4+x_5+x_6+x_7+x_8$ | $x_3+\ldots+x_8$ | $x_2+x_3+x_4+x_5+x_6+x_7+x_8$ |
| $x_9$ | $x_8+x_9$ | $x_7+x_8+x_9$ | $x_0+\ldots+x_9$ | $x_4+x_5+x_6+x_7+x_8+x_9$ | $x_4+\ldots+x_9$ | $x_3+x_4+x_5+x_6+x_7+x_8+x_9$ |
| $x_{10}$ | $x_9+x_{10}$ | $x_8+x_9+x_{10}$ | $x_0+\ldots+x_{10}$ | $x_5+x_6+x_7+x_8+x_9+x_{10}$ | $x_5+\ldots+x_{10}$ | $x_4+x_5+x_6+x_7+x_8+x_9+x_{10}$ |

FIG. 6

MULTIPLIERLESS PYRAMID FILTER

BACKGROUND

This disclosure is related to pyramid filters.

In image processing it is often desirable to decompose an image, such as a scanned color image, into two or more separate image representations. In this context, these are referred to as background and foreground images. This descreening is also sometimes applied to remove halftone patterns that may exist in an original scanned image. For example, these halftone patterns may cause objectionable artifacts for human eyes if not properly removed. The traditional approach for this decomposition or descreening is to filter the color image in order to blur it. These blurred results are then used to assist in determining how much to blur and sharpen the image in order to produce the decomposition. Typically this blurring can be achieved using a "symmetric pyramid" filter. Symmetric pyramid finite impulse response (FIR) filters are well-known.

One disadvantage of this image processing technique, however, is that the complexity increases many fold when a number of pyramid filters of different sizes are applied in parallel in order to generate multiple blurred images, to apply the technique as just described. A brute force approach for this multiple pyramid filtering approach is to use multiple FIR filters in parallel, as illustrated in FIG. 1. Such an approach demonstrates that the design and implementation of fast "symmetric pyramid filtering" architectures to generate different blurred images in parallel from a single source image may be desirable.

The numbers provided in parenthesis for each FIR block in FIG. 1 represents the pyramid filter of corresponding length. For example, (1, 2, 1) are the filter coefficients for a symmetric pyramid finite impulse response (FIR) filter of order or length 3. Likewise, (1, 2, 3, 2, 1) are the coefficients for an FIR pyramid filter of order 5, and so forth.

Unfortunately, the approach demonstrated in FIG. 1 has disadvantages. For example, inefficiency may result from redundant computations. Likewise, FIR implementations frequently employ multiplier circuits. While implementations exist to reduce or avoid the use of multipliers, such as with shifting and summing circuitry, that may then result in increased clocking and, hence, may reduce circuit throughput. A need, therefore, exists for improving pyramid filtering implementations or architectures.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and appendages thereof, may best be understood by reference of the following detailed description when read with the accompanying drawing in which:

FIG. 5 is a table showing a chronological sequence of state variable signal samples for one implementation of a pyramid filter in accordance with the present invention; and FIG. 6 is a table showing a chronological sequence of filtered output signal samples for one implementation of a pyramid filter in accordance with the present invention.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail in order so as not to obscure the present invention.

As previously described, pyramid filtering, in particular, symmetric pyramid filtering, may be employed in connection with color images or color image processing in order to decompose or descreen the image, such as into a background and foreground image, for example. Although the present invention is not limited in scope in this respect, in such a context, pyramid filtering architectures that reduce computational complexity or processing and/or hardware cost are particularly desirable. Likewise, implementations that are multiplierless, that is do not specifically employ any multiplications in the implementation, are also desirable usually because such implementations or embodiments are cheaper to implement than those that employ or include multiplier circuits.

Figure 1:
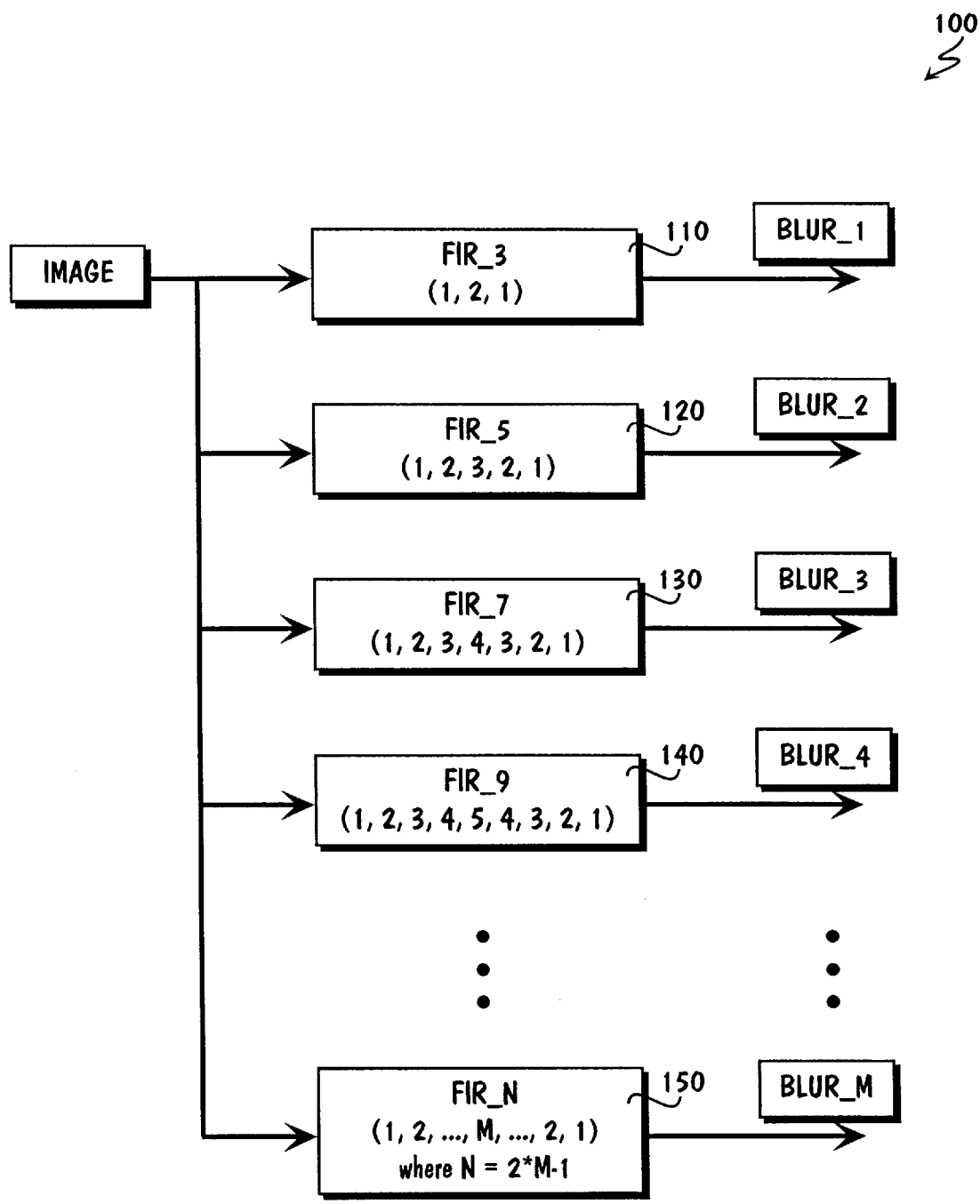
FIG. 1 is a block diagram illustrating a brute force approach to implementing a finite impulse response (FIR) multiple pyramid filtering architecture.
Figure 2:
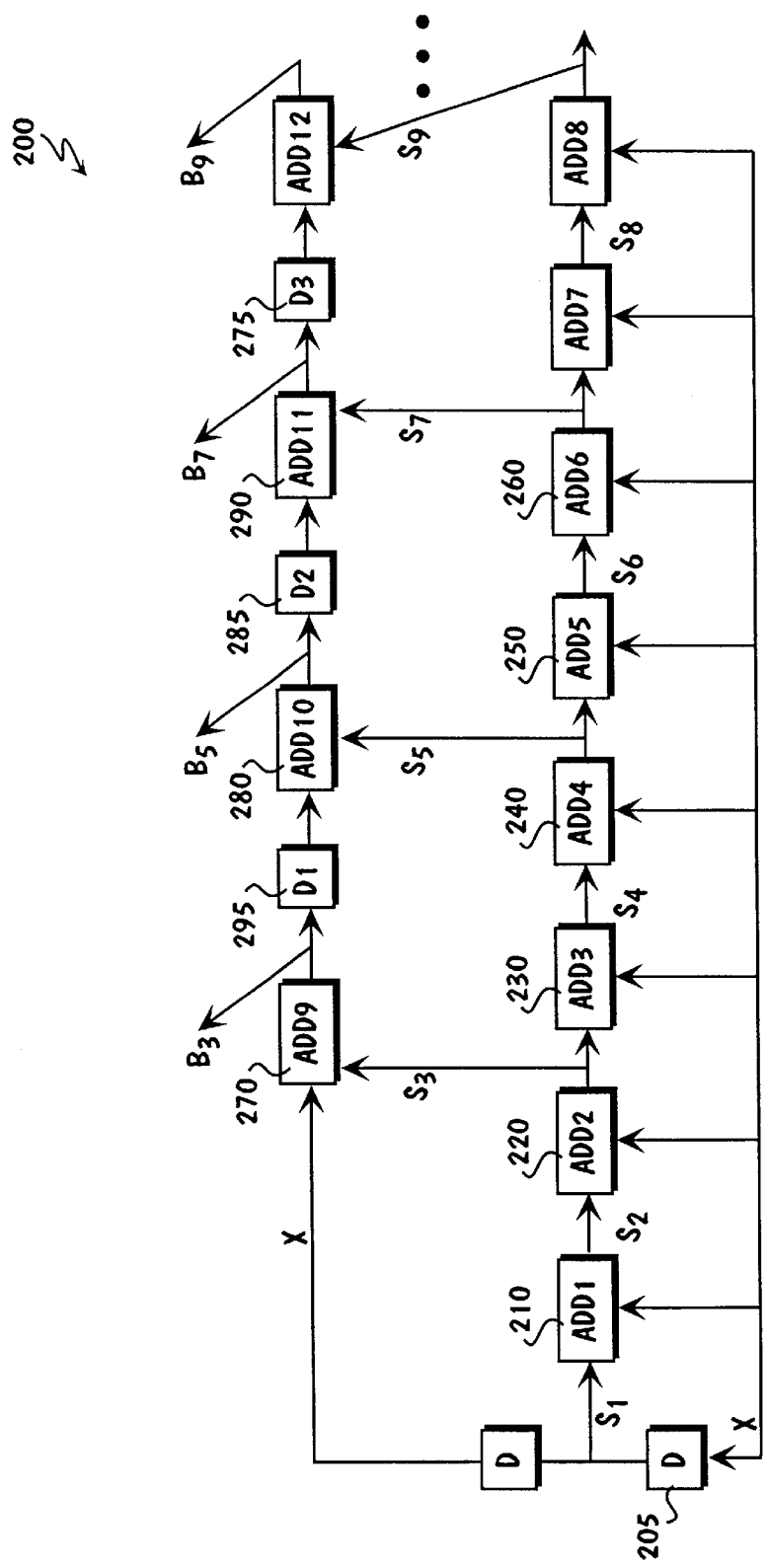
FIG. 2 is one embodiment of a multiplierless pyramid filter in accordance with the present invention.

Although the invention is not limited in scope in this respect, FIG. 2 illustrates one embodiment 200 of a pyramid filter in accordance with the present invention. The embodiment 200 comprises a unified multiplierless cascaded symmetric pyramid filtering architecture to generate a multiple number of filtered output signal streams for a series or sequence of pyramid filters having different orders, the generation of the output signal streams occurring in parallel. In this particular embodiment, although the invention is not limited in scope in this respect, a filtered output signal stream is produced on every clock cycle for each pyramid filter of a different order being implemented. Therefore, in addition to being computationally efficient, this particular embodiment produces good results in terms of throughput.

FIG. 2 is understood in the context of specific notation. For example, an input source signal, X, may be designated as follows:

$$X = (x_0, x_1, \ldots, x_{i-2}, x_{i-1}, x_i, x_{i+1}, x_{i+2}, \ldots)$$

In digital or discrete signal processing, filtering may be expressed as a convolution, $\square$, of the input signal, X, and a filter, F, in this context a digital filter of finite length, referred to here as a finite impulse response (FIR) filter. Therefore, the filtered output signal stream is indicated as follows:

$$Y = X \square F$$

As previously described, this particular embodiment of the invention employs pyramid filters. These filters are typically implemented using digital filters of lengths or orders that are odd, such as 3, 5, 7, 9, etc. Some examples of such digital filters are as follows:

$$F_3 = (1, 2, 1)$$

$$F_5 = (1, 2, 3, 2, 1)$$

$$F_7 = (1, 2, 3, 4, 3, 2, 1)$$

$F_9 = (1, 2, 3, 4, 5, 4, 3, 2, 1)$

...

$F_N = (1, 2, 3, \ldots, [N-1]/2, \ldots, 3, 2, 1)$

For the foregoing filters, the filtered output signals or output signal streams may be represented as follows:

$B^3 = X \square F_3 = (b_0^3, b_1^3, \ldots, b_{i-1}^3, b_i^3, b_{i+1}^3, \ldots)$ result of input signal $X$ filtered by $F_3$ $B^5 = X \square F_5 = (b_0^5, b_1^5, \ldots, b_{i-1}^5, b_i^5, b_{i+1}^5, \ldots)$ result of input signal $X$ filtered by $F_5$ $B^7 = X \square F_7 = (b_0^7, b_1^7, \ldots, b_{i-1}^7, b_i^7, b_{i+1}^7, \ldots)$ result of input signal $X$ filtered by $F_7$ $B^9 = X \square F_9 = (b_0^9, b_1^9, \ldots, b_{i-1}^9, b_i^9, b_{i+1}^9, \ldots)$ result of input signal $X$ filtered by $F_9$

...

$B^N = X \square F_N = (b_0^N, b_1^N, \ldots, b_{i-1}^N, b_i^N, b_{i+1}^N, \ldots)$ result of input signal $X$ filtered by $F_N$ An alternate way to empirically represent these filtered output signal samples is as follows:

$b_i^3 = x_{i-1} + 2x_i + x_{i+1}$ $b_i^5 = x_{i-2} + 2x_{i-1} + 3x_i + 2x_{i+1} + x_{i+2}$ $b_i^7 = x_{i-3} + 2x_{i-2} + 3x_{i-1} + 4x_i + 3x_{i+1} + 2x_{i+2} + x_{i+3}$ $b_i^9 = x_{i-4} + 2x_{i-3} + 3x_{i-2} + 4x_{i-1} + 5x_i + 4x_{i+1} + 3x_{i+2} + 2x_{i+3} x_{i+4}$

Likewise, by introducing what is referred to, in this context, as state variables, the above expressions may be re-expressed as follows:

$b_i^3 = x_i + s_i^3$, where $s_i^3 = x_{i-1} + x_i + x_{i+1}$ $b_i^5 = b_i^3 + s_i^5$, where $s_i^5 = x_{i-2} + x_{i-1} + x_i + x_{i+1} + x_{i+2}$ $b_i^7 = b_i^5 + s_i^7$, where $s_i^7 = x_{i-3} + x_{i-2} + x_{i-1} + x_i + x_{i+1} + x_{i+2} + x_{i+3}$ $b_i^9 = b_i^7 + s_i^9$, where $s_i^9 = x_{i-4} + x_{i-3} + x_{i-2} + x_{i-1} + x_i + x_{i+1} + x_{i+2} + x_{i+3} x_{i+4}$ Hence, the desired pyramid filter may be expressed as follows:

$B^3 = X + S_3$, where $S_3 = (s_0^3, s_1^3, s_2^3, \ldots, s_{i-1}^3, s_i^3, s_{i+1}^3, \ldots)$ $B^5 = B^3 + S_5$, where $S_3 = (s_0^5, s_1^5, s_2^5, \ldots, s_{i-1}^5, s_i^5, s_{i+1}^5, \ldots)$ $B^7 = B^5 + S_7$, where $S_7 = (s_0^7, s_1^7, s_2^7, \ldots, s_{i-1}^7, s_i^7, s_{i+1}^7, \ldots)$ $B^9 = B^7 + S_9$, where $S_9 = (s_0^9, s_1^9, s_2^9, \ldots, s_{i-1}^9, s_i^9, s_{i+1}^9, \ldots)$ A study of FIG. 2 illustrates that the computed output signal streams, $B_3$, $B_5$, $B_7$, $B_9$, etc. of the pyramid filters shown in FIG. 2 are produced by the embodiment illustrated.

FIG. 5 is a table illustrating a chronological sequence of state variable signals or state variable signal streams, $S_2$, $S_3$, $S_4$, . . . $S_7$ generated respectively by adders, 210, 220, . . . , 260, illustrated in FIG. 2. Likewise, FIG. 6 is a table showing a chronological sequence of filtered output signal streams, $B_3$, $B_5$, $B_7$, etc. As illustrated in FIG. 2, these output signal streams are produced by adders 270, 280 and 290.

In addition to providing the filtered output signal streams, $B_3$, $B_5$, $B_7$, the table in FIG. 6 illustrates the generation of these filtered output signal streams in chronological order of clocking as applied to the pyramid filter architecture embodiment shown in FIG. 2. As previously illustrated, output signal streams may also be produced from signal samples, such as $x_i$ and $s_i$, that is the input signal samples and the state variable signal samples. However, the table shown in FIG. 6 illustrates that $b_i^3$ is generated one clock cycle ahead of $s_i^5$. Therefore, by delaying the signal sample $b_i^3$ by a clock cycle, it may be added or summed with $s_i^5$ to generate $b_i^5$ in accordance with the equations provided previously. This is accomplished, for example, by delay element or digital delay unit 295 in FIG. 2. Therefore, output signal sample $B_3$ delayed by one clock cycle is summed with state variable signal sample $S_5$ to generate output signal samples $B_5$. Likewise, digital delay units 285 and 275 may be employed to generate output signal sample streams $B_5$ and $B_7$, respectively. Likewise, the input signal sample stream, X, may be delayed and summed with $S_3$ to generate pyramid filter output signal sample stream $B_3$.

Figure 3:
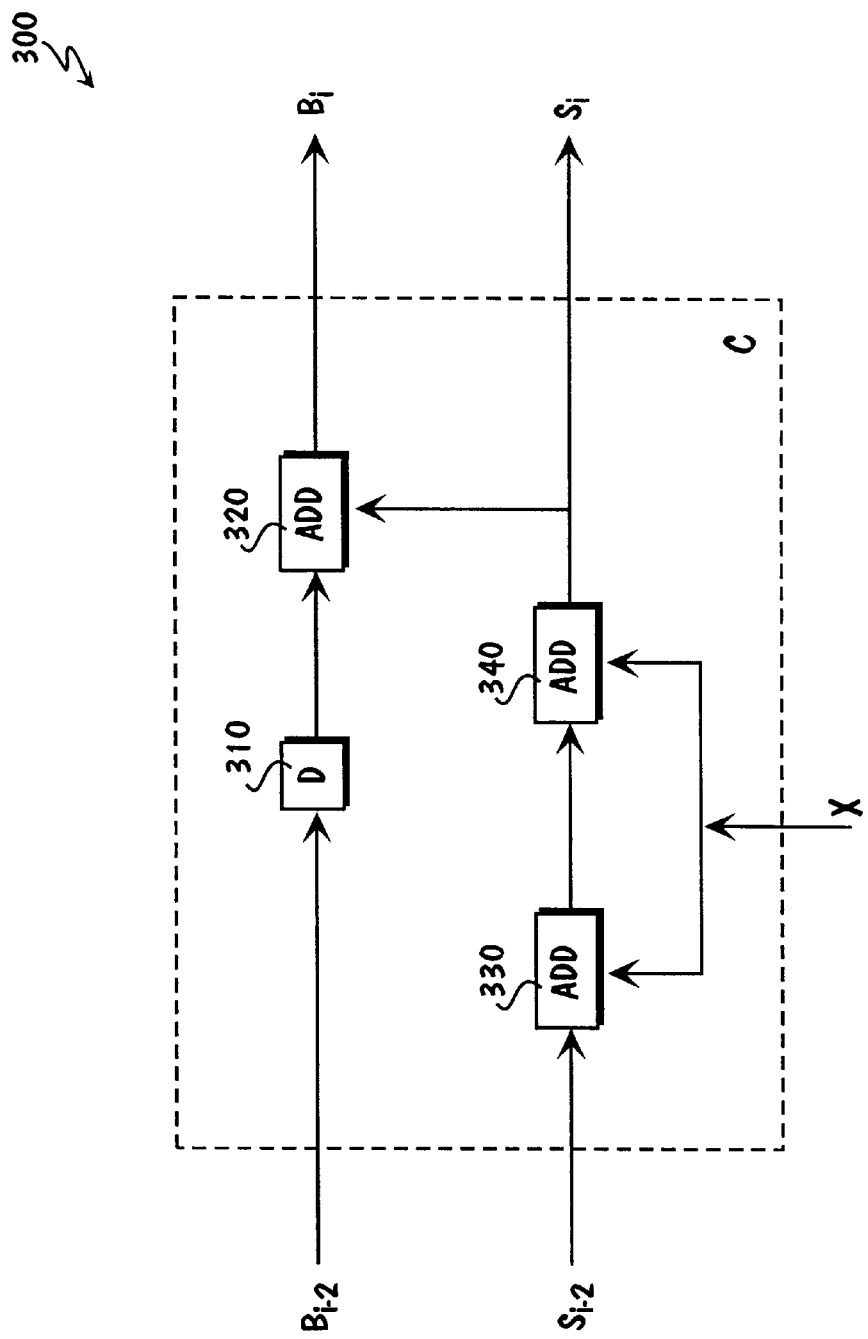
FIG. 3 is one embodiment of a subcomponent of a pyramid filter in accordance with the present invention.

It is noted that the embodiment in accordance with the invention shown in FIG. 2 may be reorganized or redrawn to take into account an embodiment of a component of a pyramid filter in accordance with the invention, as shown in FIG. 3. Embodiment 300 shown in FIG. 3 comprises a pyramid filter component including a delay unit 310 and three adders 320, 330 and 340. For high speed and through-put performance, fast adders may be employed, such as proposed in the literature. A "Carry Lookahead Adder" is one such example, although the invention is not restricted in scope in this respect. In this particular embodiment, the delay unit and adders are coupled to produce higher order pyramidally output signal samples or signal sample streams and pyramidally filtered state variable signal samples or signal sample streams from input signal samples or signal sample streams and lower order pyramidally filtered output signal samples or signal sample streams. For example, referring to the embodiment shown in FIG. 3, X comprises the input signal samples or signal sample stream, $B_i$ comprises the high order of pyramidally filtered output signal samples or signal sample stream, and $S_i$ represents the pyramidally filtered state variable signal samples or signal sample stream. Likewise, $B_{i-2}$ comprises or represents the lower order pyramidally filtered output signal samples or signal sample stream and $S_{i-2}$ represents the lower order pyramidally filtered state variable signal samples or signal sample stream. Therefore, in this particular embodiment, the difference in order between the higher and lower order pyramidally filtered output signal samples and state variable signal samples or signal sample streams is two, although, of course, the invention is not limited in scope in this respect.

Figure 4:
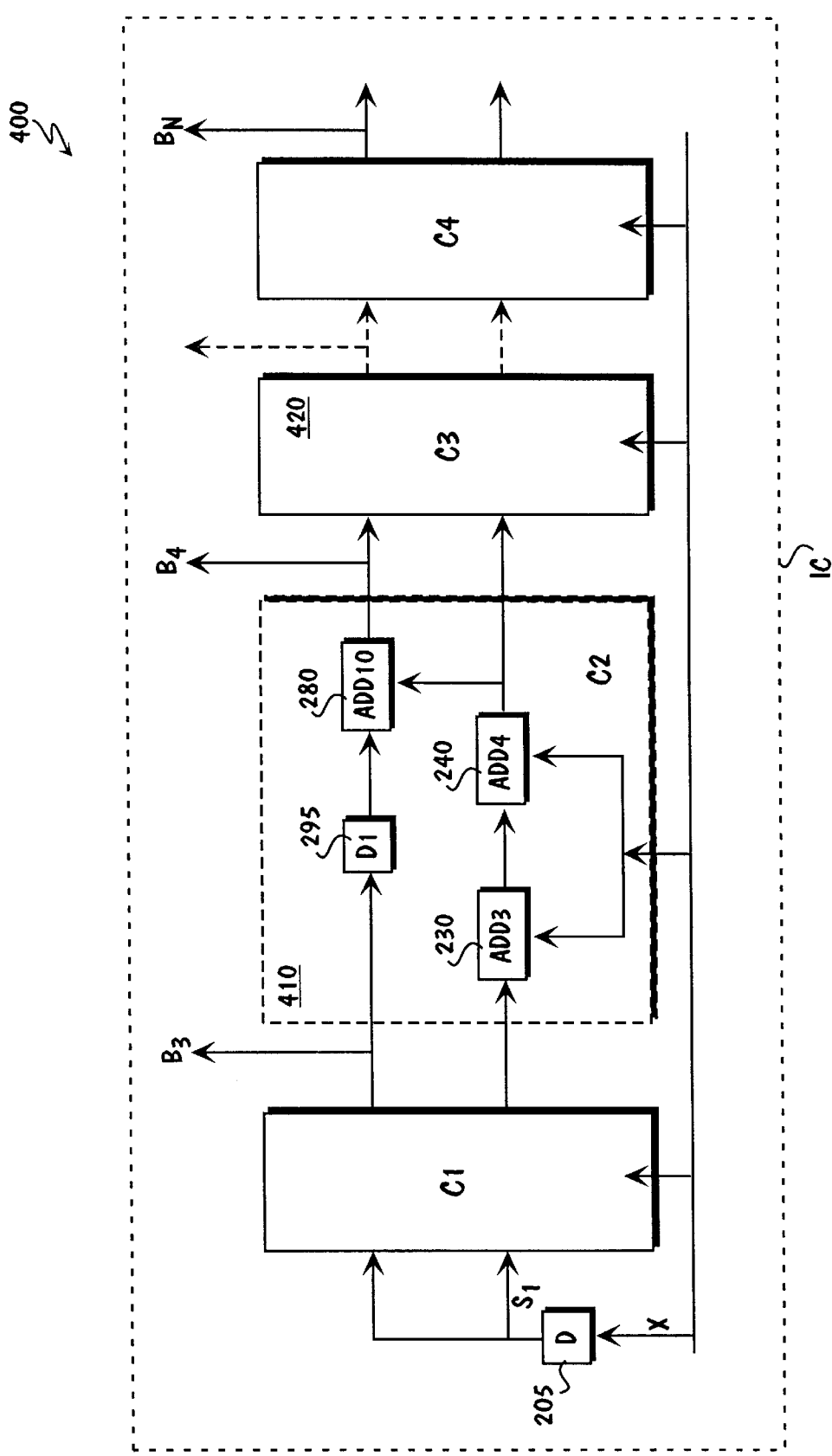
FIG. 4 is the embodiment of FIG. 2 employing the embodiment of FIG. 3.

FIG. 4 shows the embodiment of FIG. 2 applying the embodiment of FIG. 3 as a component or subcomponent. Therefore, a component 410 is illustrated in FIG. 4 comprising delay unit 295 and adders 280, 230 and 240 from FIG. 2. Likewise, for the embodiment shown in FIG. 4, the pyramid filter 200 is shown implemented on an integrated circuit 400. Likewise, as illustrated in FIG. 4, pyramid filter 200 comprises a sequence of scalable cascaded multiplierless units, such as 410, 420, etc. Likewise, each of these scalable cascaded multiplierless units produces a different order of pyramidally filtered output signal samples or a different order output signal stream. For example, unit 410 produces output signal samples or signal sample stream $B_5$, unit 420 produces output signal samples or signal sample stream $B_7$, etc.

It will, of course, be understood that, although particular embodiments have just been described, the invention is not limited in scope to a particular embodiment or implementation. For example, one embodiment may be in hardware, whereas another embodiment may be in software. Likewise, an embodiment may be in firmware, or any combination of hardware, software, or firmware, for example. Likewise, although the invention is not limited in scope in this respect, one embodiment may comprise an article, such as a storage medium. Such a storage medium, such as, for example, a CD-ROM, or a disk, may have stored thereon instructions, which when executed by a system, such as a computer system or platform, or an imaging system, for example, may result in an embodiment of a method in accordance with the present invention being executed, such as an embodiment of a method of filtering or processing an image or video, for example, as previously described. For example, an image processing platform or an imaging processing system may include an image processing unit, a video or image input/output device and/or memory.

While certain features of the invention have been illustrated and described herein, many modifications, substitutions, changes and equivalents will now occur to those skilled in the art. It is, therefore, to be understood that the appended claims are intended to cover all such modifications and changes as fall within the true spirit of the invention.

What is claimed is:

1. An integrated circuit comprising:

a pyramid filter;

said pyramid filter comprising a sequence of scalable cascaded multiplerless units, each of said units producing a different order pyramidally filtered output signal sample stream.

2. The integrated circuit of claim 1, wherein at least one of said multiplierless units comprises a delay unit and three adders, said delay unit and adders being coupled to produce a higher order pyramidally filtered output signal sample stream and state variable signal sample stream from an input signal sample stream and a lower order pyramidally filtered output signal sample stream and state variable signal sample stream.

3. The integrated circuit of claim 2, wherein the difference in order between the higher and lower order pyramidally filtered output signal sample stream and state variable signal sample stream is two.

4. The integrated circuit of claim 3, wherein the adders comprise carry lookahead adders.

5. An image processing system comprising:

an image processing unit to filter scanned color images;

said image processing unit including at least one pyramid filter;

said at least one pyramid filter comprising a sequence of scalable cascaded multiplerless units, each of said units producing a different order pyramidally filtered output signal sample stream.

6. The image processing system of claim 5, wherein at least one of said multiplierless units comprises a delay unit and three adders, said delay unit and adders being coupled to produce a higher order pyramidally filtered output signal sample stream and state variable signal sample stream from an input signal sample stream and a lower order pyramidally filtered output signal sample stream and state variable signal sample stream.

7. The image processing system of claim 6, wherein the difference in order between the higher and lower order pyramidally filtered output signal sample stream and state variable signal sample stream is two.

8. The image processing system of claim 7, wherein the adders comprise carry lookahead adders.

* * * * *